(12) United States Patent
Rozental

(10) Patent No.: US 7,567,620 B2
(45) Date of Patent: Jul. 28, 2009

(54) DATA TRANSMISSION SCHEME USING CHANNEL GROUP AND DOCSIS IMPLEMENTATION THEREOF

(75) Inventor: Roman Rozental, Netania (IL)

(73) Assignee: Texas Instruments Incorporated, Dallas, TX (US)

( * ) Notice: Subject to any disclaimer, the term of this patent is extended or adjusted under 35 U.S.C. 154(b) by 591 days.

(21) Appl. No.: 11/165,174

(22) Filed: Jun. 22, 2005

(65) Prior Publication Data
US 2006/0015917 A1    Jan. 19, 2006

Related U.S. Application Data

(60) Provisional application No. 60/584,020, filed on Jun. 30, 2004.

(51) Int. Cl.
*H04K 1/10* (2006.01)

(52) U.S. Cl. ........................ 375/260; 375/267; 375/132; 370/337; 370/330; 370/335; 455/517; 455/422; 455/464

(58) Field of Classification Search ................. 375/132, 375/133, 260, 267; 370/337, 330, 335; 455/517, 455/422, 464, 426.1, 447
See application file for complete search history.

(56) References Cited

U.S. PATENT DOCUMENTS

| | | | | |
|---|---|---|---|---|
| 5,303,287 | A * | 4/1994 | Laborde | 455/426.1 |
| 5,428,602 | A * | 6/1995 | Kemppainen | 370/330 |
| 5,430,713 | A * | 7/1995 | Gupta et al. | 370/330 |
| 6,259,722 | B1 * | 7/2001 | Dicker et al. | 375/132 |
| 6,490,262 | B1 * | 12/2002 | Hogger | 370/337 |
| 6,829,486 | B2 * | 12/2004 | McKenna et al. | 455/464 |
| 7,190,683 | B2 * | 3/2007 | Giallorenzi et al. | 370/335 |
| 7,277,411 | B2 * | 10/2007 | Shneyour et al. | 370/337 |
| 2001/0022806 | A1 * | 9/2001 | Adachi | 375/133 |
| 2002/0037716 | A1 * | 3/2002 | McKenna et al. | 455/422 |
| 2002/0039907 | A1 * | 4/2002 | McKenna et al. | 455/517 |
| 2005/0020271 | A1 * | 1/2005 | Fukuda et al. | 455/447 |

OTHER PUBLICATIONS

IEEE Standard 802.3 Part 3: Carrier sense multiple access with collision detection (CSMA/CD) access method and physical layer specifications, Mar. 8, 2002, pp. 285-292.

* cited by examiner

*Primary Examiner*—Sudhanshu C Pathak
(74) *Attorney, Agent, or Firm*—Steven A. Shaw; W. James Brady; Frederick J. Telecky, Jr.

(57) ABSTRACT

A novel apparatus for and a method of data transmission whereby an input data stream is distributed over a plurality of physical channels within a logical channel group. Transmission of data over the channel group appears as transmission over a single logical channel having a bandwidth approximately equal to the sum of the physical channel bandwidths. The physical channels making up the logical channel group may have different bandwidth capacities. The invention comprises a method of data unit distribution among a plurality of physical channels including the consideration of the bandwidth capacities of the individual physical channels in implementing the distribution algorithm, and the capability of reproducing the order of the transmission of the data units on the receiving side without the need for additional fields or modification of existing fields of the data units. The method of the present invention performs an algorithm whereby the transmitter and the receiver only need to decide to transmit/receive a data unit using the current channel or to switch to the next channel in the channel pool (i.e. the channel group). This decision is made considering the value of a bandwidth parameter and current 'credit' counter associated with each channel.

53 Claims, 6 Drawing Sheets

DATA TRANSMISSION SCHEME USING CHANNEL GROUP AND DOCSIS IMPLEMENTATION THEREOF

REFERENCE TO RELATED APPLICATION

This application claims priority to U.S. Provisional Application Ser. No. 60/584,020, filed Jun. 30, 2004, entitled "Data Transmission Method Using Channel Group and Method Implementation for DOCSIS3.0 Downstream", incorporated herein by reference in its entirety.

FIELD OF THE INVENTION

The present invention relates to the field of data communications and more particularly relates to an apparatus for method of transmitting a data stream by distributing data units over a plurality of physical channels within a channel group.

BACKGROUND OF THE INVENTION

Multiplexing is a conventional technique well known in the communication arts. In conventional multiplexing, several input data streams are combined or merged (i.e. multiplexed) into a single output stream and transmitted over a single channel. Typically, the communications channel is of a substantially higher data rate than the data rate of any of the input data streams. Multiplexing is an effective technique that is used to reduce the number of separate links required to transmit information from multiple sources from one point to another.

Inverse multiplexing is also a technique well known in the communication arts. In this technique, rather than combine data from separate sources into a single output stream, data from one source is split into multiple streams. Inverse multiplexing is often used in cases where high-speed links are not available to carry a high rate data stream. Rather than transmit the data over a single link, the input data is split into multiple streams and transmitted over several links that may be at a lower rate than the input. Inverse multiplexing is used, for example, with Gigabit Ethernet wherein a 1 Gbps stream is split into and transmitted over 4 separate links or 250 Mbps each. At the transmitter, the input stream is split into a plurality of slower output streams, each output stream is transmitted and collected at the receiver where they are all combined to generate the original data stream.

To implement inverse multiplexing, most systems modify the packets or frames before they are sent over the separate links. The modifications made typically include the insertion of labels, indications, sequence numbers, etc. that are required for the receiver to be able to determine the original order of the packets. Without the packet modifications, the receiver would not know how to combine (i.e. reproduce the original order of) the packets it receives over the separate links.

A problem with this prior art scheme, however, is that in some systems it is not practical or not permitted to modify packets for transmission over the separate links. Thus, prior art inverse multiplexing techniques cannot be used in systems that do not permit modifications to the packets.

Other prior art solutions permit grouping several physical channels into a logical channel. In such prior art systems, however, usage as a single logical channel is implemented by grouping the physical channels according to channel capacities. Thus, physical channels having different bandwidths cannot be grouped together to form a single logical channel.

The IEEE 802.3ad-2000 standard entitled "Amendment to Carrier Sense Multiple Access with Collision Detection (CMSA/CD) Access Method and Physical Layer Specifications—Aggregation of Multiple Link Segments" describes a data transmission scheme. The major disadvantages of this scheme are (1) the standard contemplates many data substreams (i.e. conversations) in the stream and (2) each substream can use only one physical channel. Thus, traffic balancing is very restricted and in the case of one substream in the stream, no parallel transmission occurs at all and only equal capacity channels are considered.

There is thus a need for a scheme that is capable of transmitting an input data stream over a plurality of links and recombining the separate streams at the receiver without requiring any modifications to be made to the packets and that also permits the grouping of physical channels without regard to their bandwidth capacities.

SUMMARY OF THE INVENTION

The present invention is a novel apparatus for and a method of data transmission whereby an input data stream is distributed over a plurality of physical channels within a logical channel group. Transmission of data over the channel group appears as transmission over a single logical channel having a bandwidth approximately equal to the sum of the physical channel bandwidths. In accordance with the invention, the physical channels making up the logical channel group may have different bandwidth capacities while data units may have variable length.

The data transmission scheme of the present invention is presented with application to any suitable communications system. In addition, the data transmission scheme is presented as applied to a DOCSIS enabled communications system.

The invention comprises a method of data unit distribution among a plurality of physical channels. Two important aspects of the invention include (1) the consideration of the bandwidth capacities of the individual physical channels in implementing the distribution algorithm (load balancing), (2) the capability of reproducing the order of the transmission of the data units on the receiving side without the need for additional fields or modification of existing fields of the data units, (3) the possibility to continue receiving data after traffic hits and (4) the possibility to join new traffic receivers with delay after transmission start.

The method of the present invention performs an algorithm whereby the transmitter and the receiver only need to decide to transmit/receive a data unit using the current channel or to switch to the next channel in the channel pool (i.e. the channel group). This decision is made considering the value of a bandwidth parameter and current 'credit' counter associated with each channel. Once a determination is made to switch to the next channel, data transmission ceases on the current channel and continues using the next channel in the cyclical channel pool. Note that the receiver implements an algorithm similar to that of the transmitter in order to determine how many data units to receive over any particular channel.

The data transmission of the present invention has several advantages. These include (1) the data unit length may be variable; (2) the bandwidths of the data channels need not be the same; (3) more flexible distribution of data units between channels within a group than compared to IEEE 802.3ad specification; (4) the scheme does not require labels to be inserted into the data units in order to reconstruct the original stream at the receiver; (5) the scheme provides load balancing between channels in the group obviating the need for separate load balancing mechanism; and (6) the channels in a channel group may have different (but constant) downstream transmission profiled, with no restrictions for the downstream profile combinations in the channel group.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention, a method of multi-channel data transmission over a channel group having a plurality of channels, the method comprising the steps of first determining at a transmitter, for each data unit to be transmitted, a designated channel each data unit is to be transmitted over, transmitting each data unit over the designated channel assigned thereto, second determining at a receiver, the designated channel a data unit is to be received over and receiving each data unit over its designated channel.

There is also provided in accordance with the present invention, a method of data transmission over a channel group having a plurality of channels, the method comprising the steps of receiving an input stream of data units to be transmitted over the channel group, transmitting the data units over a current channel and determining when to cease transmission on the current channel and begin transmitting on a next channel within the channel group based on the value of a transmit counter associated with the current channel.

There is further provided in accordance with the present invention, a method of data transmission over a channel group having a plurality of channels, the method comprising the steps of first determining at a transmitter, for each data unit to be transmitted, whether to send the data unit over a current channel or a next channel in the channel group based on a first current counter value, to yield a first channel selection thereby, transmitting each data unit over its first channel selection associated therewith, second determining at a receiver, whether to receive a data unit over the current channel or the next channel in the channel group based on a second current channel value, to yield a second channel selection thereby and receiving a data unit over its second channel selection associated therewith.

There is also provided in accordance with the present invention, an apparatus for data transmission over a channel group having a plurality of channels comprising a distributor at a transmitter coupled to a data source and the channel group, the distributor operative to determine, based on a first counter value associated with a channel, whether to transmit a data unit over a current channel or a next channel within the channel group and to transmit the data unit in accordance with a first determination and one or more aggregators at a receiver coupled to the channel group and operative to determine, based on a second counter value associated with a channel, whether to receive a data unit over the current channel or the next channel and to receive the data unit in accordance with a second determination.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
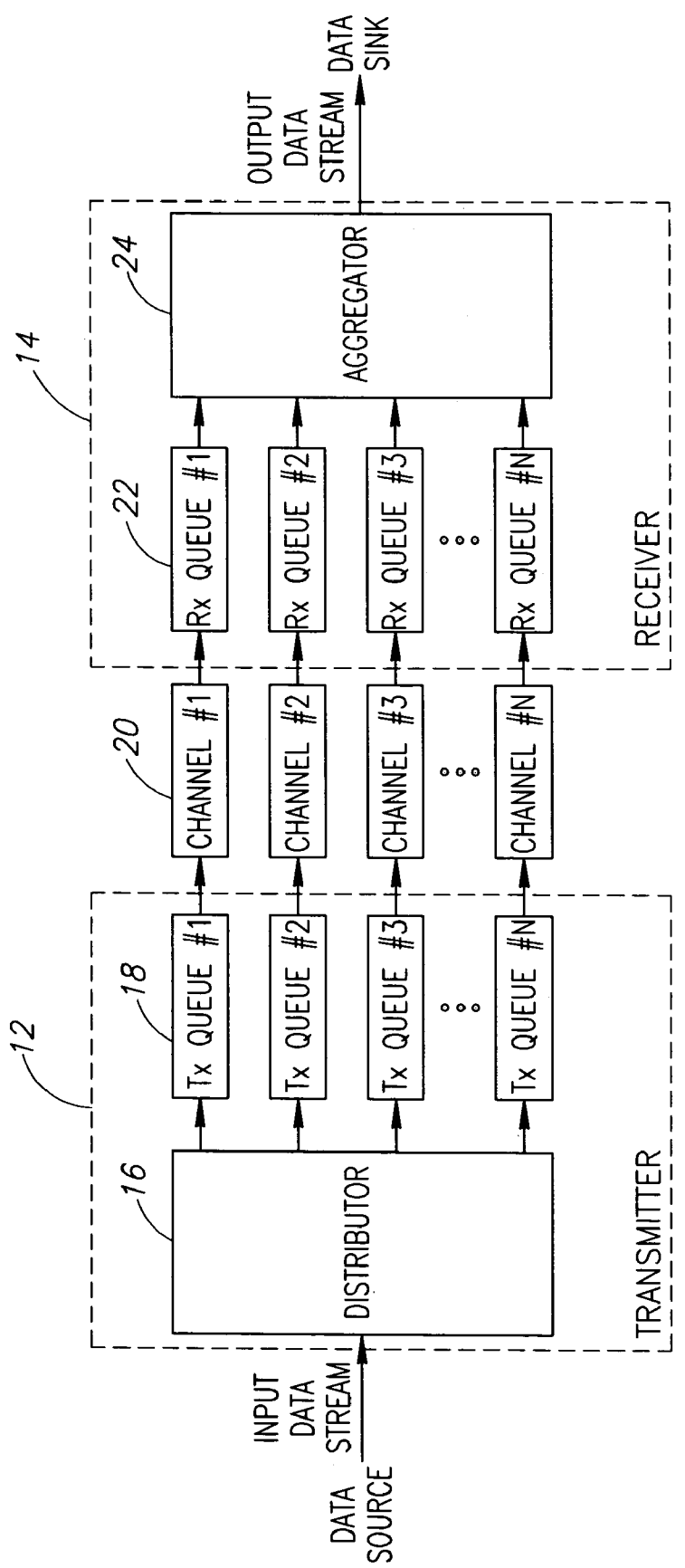
FIG. 1 is a block diagram illustrating an example embodiment constructed in accordance with the method of data transmission over a channel group of the present invention.

The following notation is used throughout this document.

| Term | Definition |
| --- | --- |
| ASIC | Application Specific Integrated Circuit |
| CM | Cable Modem |
| CMTS | Cable Modem Termination System |
| DCG | DS Channel Group |
| DOCSIS | Data-Over-Cable Service Interface Specification |
| DS | Downstream |
| FPGA | Field Programmable Gate Array |
| HDL | Hardware Description Language |
| IEEE | Institute of Electrical and Electronics Engineers |
| MAC | Media Access Control |
| MPEG | Moving Picture Expert Group |
| PVT | Process, Voltage, Temperature |
| RF | Radio Frequency |
| US | Upstream |

Detailed Description of the Invention

The present invention is a novel apparatus for and a method of data transmission whereby an input data stream is distributed over a plurality of physical channels within a logical channel group. Transmission of data over the channel group appears as transmission over a single logical channel having a bandwidth approximately equal to the sum of the physical channel bandwidths. In accordance with the invention, the physical channels making up the logical channel group may have different bandwidth capacities.

The data transmission scheme of the present invention is presented with application to any suitable communications system. In addition, the data transmission scheme is presented as applied to a DOCSIS enabled communications system.

The invention comprises a method of data unit distribution among a plurality of physical channels. Several important aspects of the invention include (1) the consideration of the bandwidth capacities of the individual physical channels in implementing the distribution algorithm, (2) the capability of reproducing the order of the transmission of the data units on the receiving side without the need for additional fields or modification of existing fields of the data units, (3) the capability of continuing to receive data after traffic hits and (4) the capability of joining new traffic receivers with a delay after starting transmission.

The invention is applicable to any system in which it is desirable to estimate, calibrate and track the gain of an RF digitally controlled oscillator such as in mobile phones and other wireless applications. The invention is intended for use in a digital radio transmitter or transceiver but can be used in other applications as well, such as a general communication channel. The present invention provides a solution to the problems and disadvantages of prior art data transmission techniques.

To aid in understanding the principles of the present invention, the description is provided in the context of a Data-Over-Cable Service Interface Specification (DOCSIS) enabled communications system. It is appreciated, however, that the invention is not limited to use with any particular communication standard and may be used in cable, optical, wired, wireless or other applications. Further, the invention is not limited to use with a specific modulation scheme but is applicable to any modulation scheme including both digital and analog modulation. The invention is applicable to any system in which it is desirable to transfer a data stream in parallel over a plurality of physical channels wherein the nature of and the capacities of each channel may vary and where the fields of the data units may not be modified or added to in order to reproduce at the receiver the original data stream.

A block diagram illustrating an example embodiment constructed in accordance with the method of data transmission over a channel group of the present invention is shown in FIG. 1. For illustration purposes only, the transmitter, as shown, is adapted to distribute data units from the data source over N physical channels.

The example communications system, generally referenced 10, comprises a data source, transmitter 12, a plurality of N physical channels 20, a receiver 14 and a data sink. The transmitter 12 comprises a distributor module 16 adapted to receive the input data stream from the data source and a plurality of N transmit queues 18 coupled to the distributor and to the channels 20. The receiver 14 comprises a plurality of N receive queues 22 coupled to an aggregator 24. The aggregator generates the output data stream to the data sink.

In accordance with the invention, the distribution block 16 on the transmitter side is operative to decide over which channel to transmit each input data unit. Similarly, the aggregation block 24 on the receive side functions to collect and restore the order of the data units to generate a single output data stream. A key feature of the invention is that the distributor and the aggregator must implement the same data unit distribution algorithm and associated parameters. The algorithm performed by the distributor is operative to generate a sequence of action that can be completely and permanently reproduced on the receive side.

Example algorithms suitable for use in the distributor and aggregator modules of the transmitter and receiver, respectively, will now be presented. The following definitions apply throughout this document.

| Term | Definition |
| --- | --- |
| Data Unit | A minimal data item for transmission management having constant or variable length. |
| U | Data unit cyclic counter: After receiver initialization the counter is maintained separately on both channel ends. The counter is used in the event a problem occurs to inform the Tx side of the data unit associated with the problem. |
| Channel loop | A configurable cyclic list of all channels in the group; one of the channels in the loop is defined as the first. This specifies the channel from which the channel management cycle begins. |

-continued

| Term | Definition |
| --- | --- |
| T | The period for the distributor to repeat activities over all channels in the group. After selecting channel k the distributor fills the data queue for this channel with the data units from the incoming data stream at least for transmission during the nearest period T. Then, the distributor selects the next channel in the channel loop. T should be a common parameter for the channel group and is about the time of typical data unit transfer using one channel, e.g., 100-500 usecs. |
| L | Distributor cyclic loop counter: This counter is incremented every time the distributor returns to transmit over the first channel after transmitting over the last channel in the loop. |
| L(k) | Aggregator cyclic loop counter for channel k. The current counters L(k) can be different for different channels on the receive side. |
| B(k) | The number of bytes that can be transmitted over channel k during the time T. B(k) values can be calculated on both sides on the basis of channel k downstream parameters or passed periodically by the transmitting side in periodic management messages. Note that the bytes units may alternatively be replaced by bits, symbols, etc. and is not limited to bytes. Further, optionally, the channels in the polling group may be ordered from the channel with the largest B(k) to those with the lowest or vice versa. |
| C(k) | A signed integer variable. A bytes counter for channel k. |

It is assumed that the counters U, L and C(k) for all channels are reset to zero at the beginning of the session on both transmit and receive sides. Note that the invention provides the capability of initializing the counters to non-zero values and starting/restarting data reception from some point in time during the transmission with non-zero counter values, as described in more detail infra. The invention also provides the capability of a communication device, e.g., cable modem, to join the data receiving session with the delay from its start.

Note that before multi-channel data transmission between both channel ends can occur, both channel ends should have knowledge of several constant parameters including: channel loop specification, T and B(k). The variable parameters U, L, C(k) are synchronized between the ends during the cable modem ranging process for the case of a DOCSIS system.

The distributor and the aggregator are operative to poll the channels in the channel group using the same cyclic channels order. For each data unit, each side only needs to decide whether to use the current channel or to switch to the next channel in the channel cyclic pool. For the transmitter, the distributor only needs to decide whether to transmit a data unit using the current channel or to switch to the next channel in the channel cyclic pool. Similarly, for the receiver, the aggregator only needs to decide whether to receive a data unit using the current channel or to switch to the next channel in the channel cyclic pool.

Figure 2:
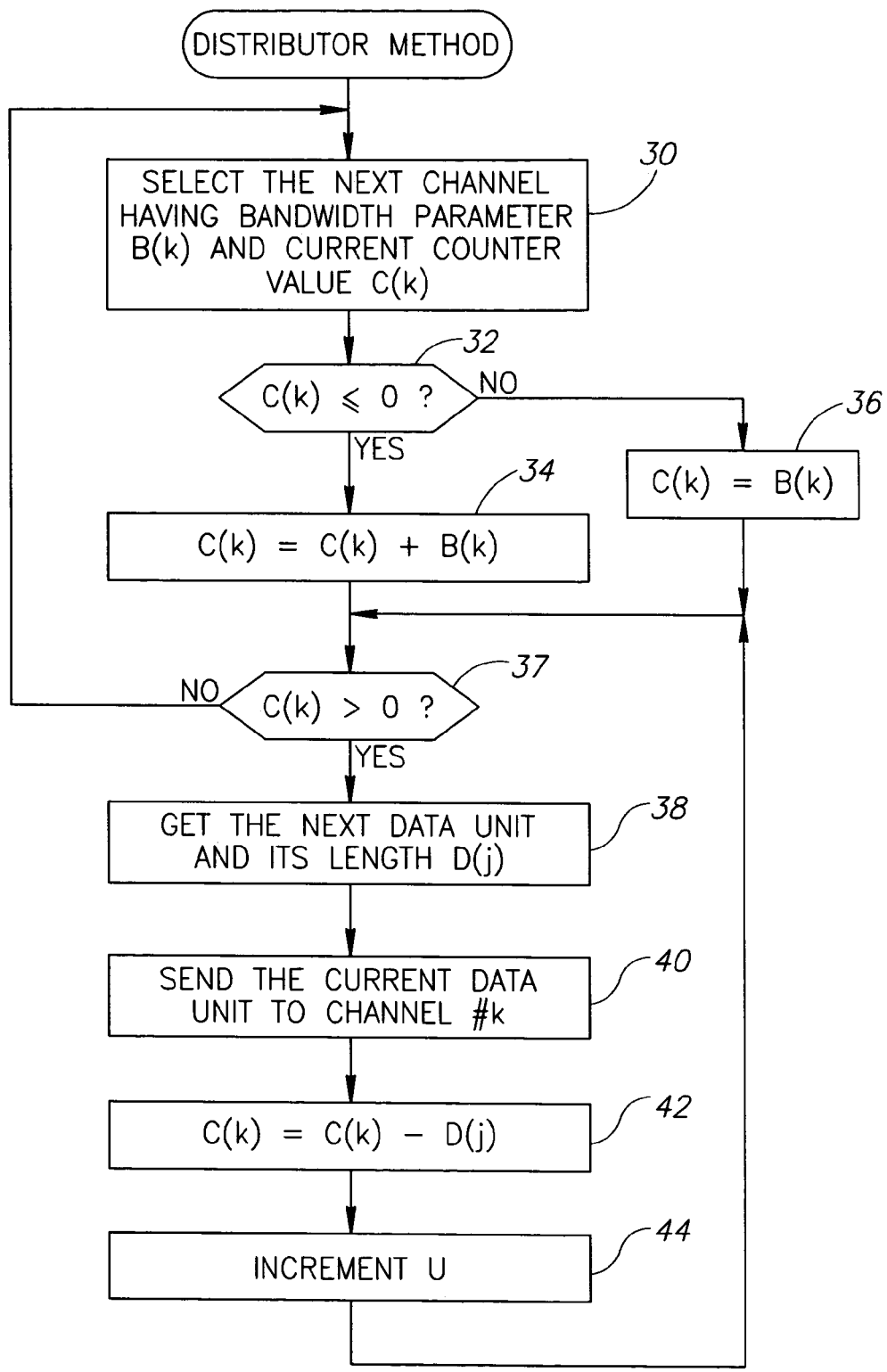
FIG. 2 is a flow diagram illustrating the distributor method of the present invention in more detail.

A flow diagram illustrating the distributor method of the present invention in more detail is shown in FIG. 2. The distributor method is adapted to be performed by the distributor 16 (FIG. 1) and is adapted to loop over all channels in the channel group and to perform actions for the current channel. First, the next channel is selected, wherein the channel has associated with it a bandwidth parameter B(k) and a current counter value C(k) (step 30). In addition, counter L is incremented if the channel selected is the first channel in the channel pool. It is then checked if the counter value is less than or equal to zero (step 32). If it is, then channel k has work from the previous loop through the channels and the new 'credit' is added to the current counter value (step 34). If the counter value is greater than zero then it means that channel k was not fully busy in the past period (no input packets) and the current counter value is set equal to the bandwidth parameter (step 36). Note that such "pauses" of data do not happen in case of MPEGs (DOCSIS) which are continuously transmitted.

While C(k) is greater than zero (step 37), the next data unit and its length D(j) is obtained (step 38), the current data unit is transmitted over channel k (step 40), the data unit length D(j) is subtracted from C(k) (step 42) and the data unit cyclic counter U is incremented (step 44). Once the counter value C(k) falls to zero or less, the distributor switches to the next channel and the method continues with step 30.

A pseudo code listing of the method performed by the distributor is presented below in Listing 1.

---
Listing 1: Distributor method
---

1. Loop over all channels in the group: perform actions 2-4 for the current channel.
/* The following actions are performed after switching to channel k with bandwidth parameter
    B(k) and current Counter value C(k) */
2. if (channel selected is the first channel in the loop) L++;
/* add transmission resource "credit" to the channel in accordance with its rate */
if (C(k) <= 0)
/* channel #k has work from the past loop over channels */
    C(k) = C(k) + B(k);
else /* k was not fully busy in the past period (no input packets); such "pauses" of data do not
    happen in case of MPEGs which are sent permanently */
    C(k) = B(k);
3. while (C(k) > 0) { /* acting in the internal loop */
/* continue channel usage */
    get the next data unit and its length D(j)
    send the current data unit for handling to channel #k>;
    C(k) = C(k) − D(j);
    U++;
}
4. Switch to the next channel and go to 2 (external loop).

---

Figure 3:
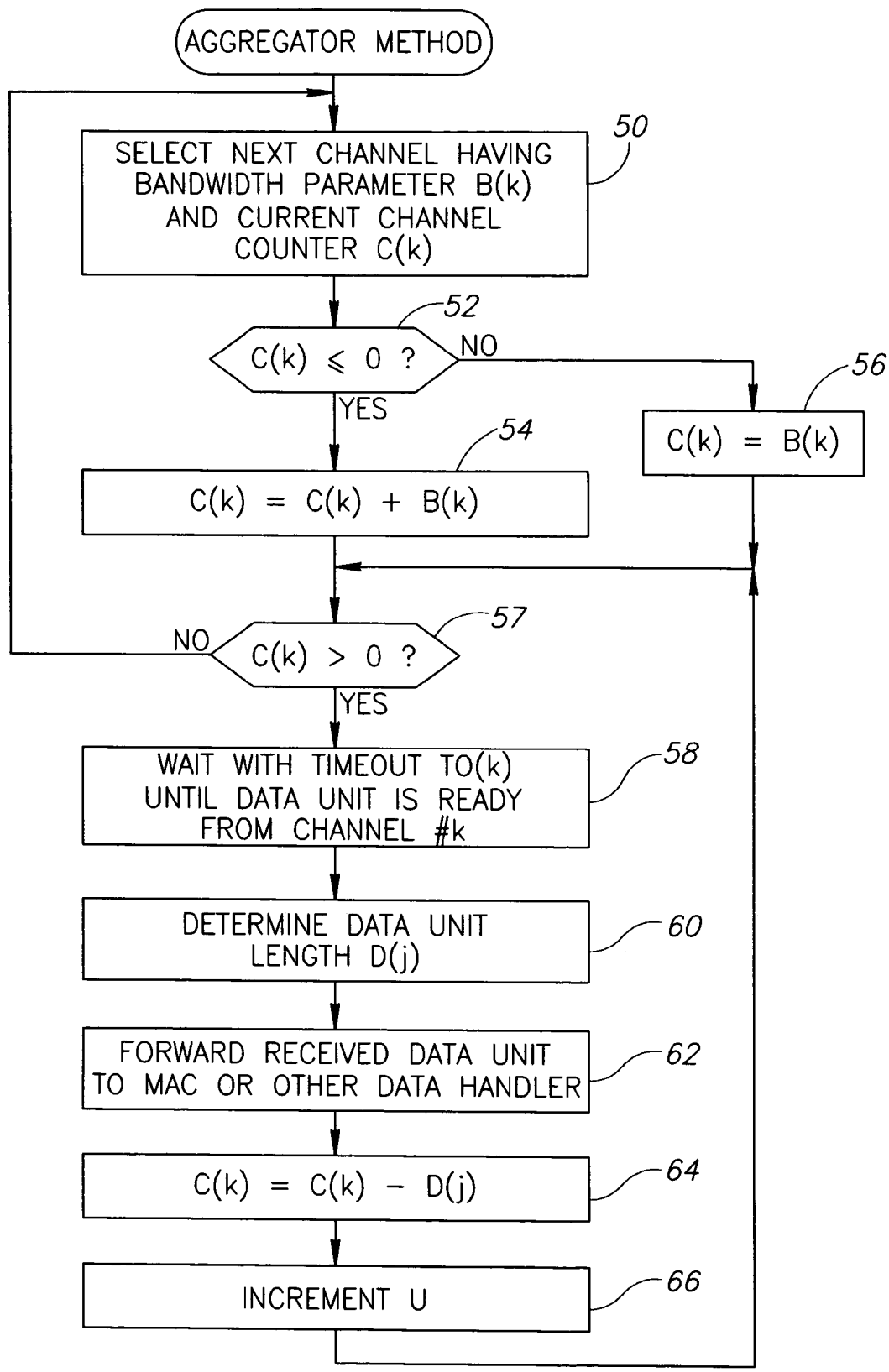
FIG. 3 is a flow diagram illustrating the aggregator method of the present invention in more detail.

The aggregator method performed by the aggregator module 24 (FIG. 1) is similar to the distributor method described hereinabove. A flow diagram illustrating the aggregator method of the present invention in more detail is shown in FIG. 3. First, the next channel is selected, wherein the channel has associated with it a bandwidth parameter B(k) and a current counter value C(k) (step 50). It is then checked if the counter value is less than or equal to zero (step 52). If it is, then channel k has work from the previous loop through the channels and the new 'credit' is added to the current counter value (step 54). If the counter value is greater than zero then it means that channel k was not fully busy in the past period (no input packets) and the current counter value is set equal to the bandwidth parameter (step 56). Note that such "pauses" of data do not happen in case of MPEGs (DOCSIS) which are continuously transmitted.

While C(k) is greater than zero (step 57), the receiver waits with timeout To(k) until a data unit is ready from channel k (step 58), the length D(j) of the received data unit is determined (step 60), the received data unit is forwarded to the MAC or other data handler (step 62), the data unit length D(j) is subtracted from C(k) (step 64) and the data unit cyclic counter U is incremented (step 66). Once the counter value C(k) falls to zero or less, the aggregator switches to the next channel and the method continues with step 50.

A pseudo code listing of the method performed by the aggregator is presented below in Listing 2.

---
Listing 2: Aggregator method
---

1. Loop over all channels in the group: perform actions 2-4 for the current channel.
/* The following actions are performed after switching to channel k with bandwidth parameter
    B(k) and current Counter value C(k) the following actions
    are done:*/
2. /* add transmission resource "credit" to the channel in accordance with its rate */
if (C(k) <= 0)
    C(k) = C(k) + B(k);
else
    C(k) = B(k);
3. while (C(k) > 0) { /* acting in the internal loop */
/* continue channel usage */
    wait with timeout To(k) until data unit is ready from channel k
    and get the next data
        unit and its length D(j);
    forward the received data unit to the MAC;
    C(k) = C(k) − D(j);
    U++;
}
4. Switch to the next channel and go to 2 (external loop).

---

A key aspect of the invention is that similar algorithms are implemented in the transmitter and the receiver in order that the receiver be able to determine how many data units to expect on any channel and to determine when to switch to the next channel. This knowledge eliminates the need for the transmitter and receiver to modify, remove or add any fields to the data units. Such modifications or additions to the fields would normally be required for the receiver to know how to reassemble the original data stream from the individual data units received over the channels.

To aid in understanding the principles of the present invention, an illustrative example of the operation of the data transmission scheme will now be presented. Consider a particular system (may or may not be DOCSIS specific) with 3 channels (i.e. channel #1 through #3) that are aggregated to multichannel. Let us assume that the channel capacities are: 9 Mbyte/sec for channel #1, 1 Mbyte/sec for channel #2 and 2.5 Mbyte/sec for channel #3. If the distributor period T=50 usec then B(1)=450 (bytes in period 1), B(2)=50 and B(3)=125. We suppose for simplicity that each data unit contains 100 bytes.

A discussion of the operation on the transmission side is followed by a discussion of the operation on the receive side. When the transmission session starts, round 1, step 1. With reference to Listing 1 above, channel #1 gets a resource of C(1)=450 bytes; the distributor performed step 3 of Listing 1 5 times. As a result, 5 data units, unit 1 to unit 5, are passed for transmission to the Tx queue associated with channel 1. Upon each data unit passed to channel 1, C(k) is decremented by 100 bytes and after the loop, C(1)=−50. This means that for the nearest period T channel #1 has 450 bytes to transmit (full capacity usage) and also has 50 additional bytes for the next period. C(1) is now negative, therefore the distributor turns its attention to channel #2.

Round 1, step 2: In a similar way channel #2 gets C(2)=50. After 1 unit passing to channel 2 (unit 6), the counter C(2)=−50 and distributor therefore turns to channel #3. Round 1, step 3: Channel #3 gets C(3)=125. So, channel 3 gets 2 units (units 7, 8) for transmission and remains with C(3)=−75.

Note that round 2 can begin 50 usec later than round 1 because all channels have data for transmission at least for the period T. Round 2, step 1: C(1)=−50+450=400. Therefore channel 1 gets 4 new units: units 9-12. Round 2. step 2:

C(2)=−50+50=0. This means that channel 2 is loaded for the next period as well. It does not get units during this round. Round 2, step 3: C(3)=−75+125=50. Therefore, the channel gets unit 13 for transmission. In 50 usec the distributor enters round 3.

Regarding the receiving side and with reference to Listing 2 above, when the receiving session starts, the receiver has information about T, B(k) and current values of C(k). Round 1, step 1: Channel #1 gets a resource 'credit' of C(1)=450 bytes; then the aggregator waits in a loop for 5 data units (unit 1-unit 5) from channel 1 (action 3 of the algorithm). Upon each data unit received from channel 1, C(1) is decremented by 100 bytes and after the loop processing, C(1)=−50. This means that all data units channel #1 received for transmission during round 1 were received already. Therefore the aggregator switches to channel #2. Note that in the case of variable length data units, the method is operative to decrement the length of the received message at each loop iteration.

Round 1, step 2: In similar fashion channel #2 gets C(2)=50. The aggregator waits for 1 data unit to be received from channel #2 (unit 6), counter C(2)=−50 and therefore the aggregator switches to channel #3. Round 1, step 3: Channel #3 gets C(3)=125. Therefore, the aggregator has to receive 2 units from channel 3 (units 7, 8) for transmission and ends up with C(3)=−75.

Round 2, step 1: C(1)=−50+450=400. Therefore, channel #1 gets new 4 units: units 9-12 for channel #2. Round 2, step 2: C(2)=−50+50=0. This means that channel #2 is loaded for the current period also, i.e. has no new data units related to the second transmission cycle. The aggregator does not wait for data units from channel #2 during this round. Round 2, step 3: C(3)=−75+125=50. Therefore, the aggregator should receive unit 13 from channel #3, etc.

It is noted that as we see from the particular example presented hereinabove, during time T of the first receiving round (referred to as T1) the aggregator receives unit 1 to unit 5 from channel #1. After this aggregator waits an additional period T for unit 6 (period T2) from the channel #2 (because its transmission takes 2*T). The aggregator must wait for the arrival of unit 6 and cannot handle the units 7-8 that already arrived at the receiver on channel #3 as well as units 9-12 on channel #1 receiver from the second Tx round. This is a typical situation for the case when maximal channel capacity in the group is several times higher than the minimal channel capacity in the group. As a rule, such situations require bigger buffers for the accumulation of data units.

The timeout expiration method of the present invention will now be described in more detail. Regarding the aggregator 24 (FIG. 1), it is preferable that the timeout period To(k) should exceed the time required for maximal data unit transmission by channel k. Note that a timeout expiration can occur in cases of (1) a traffic hit, (2) equipment failure (transmitter/channel/receiver), which may have other indications as well, and (3) a silent period: if the protocol accepts silence in the channel and there is nothing to transmit.

Figure 4:
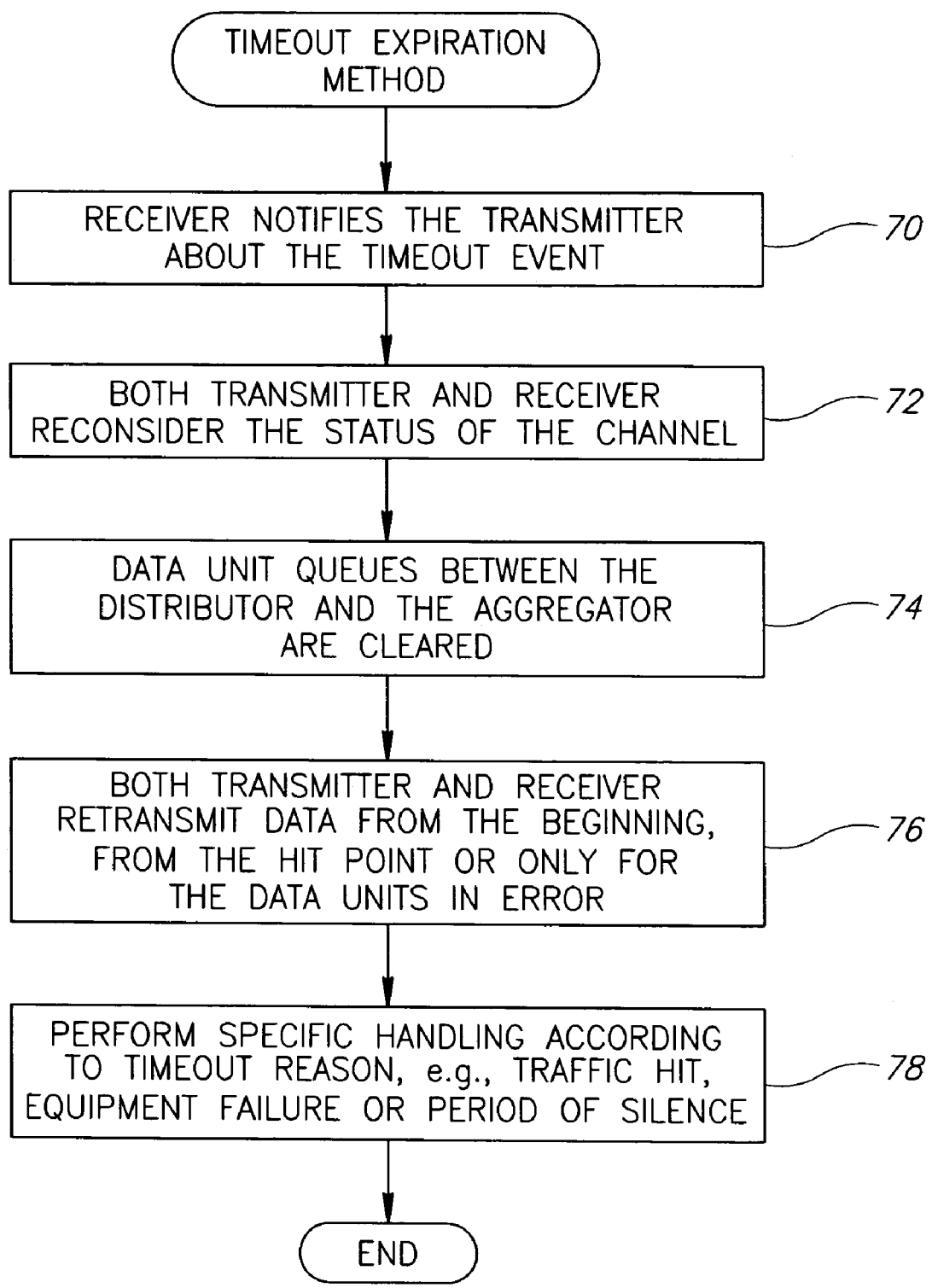
FIG. 4 is a flow diagram illustrating the timeout expiration method of the present invention in more detail.

A flow diagram illustrating the timeout expiration method of the present invention in more detail is shown in FIG. 4. Typically, a timeout expiration requires special handling that is system dependent (protocol+type-of-service+equipment+ software, etc.). The minimum that is preferably done in the event of a timeout expiration comprises (1) the receiver informing the transmitter about the event (step 70); (2) both sides having to reconsider the channel status (step 72), and optionally clearing the data unit queues between the distributor and aggregator (step 74); and (3) if required, both sides provide data retransmission either from the beginning, from the hit point or only for the data units in error (step 76). For this purpose a data units cyclic counter U may be useful. This counter is synchronized between the transmitter and receiver together with L and C(k). Therefore, the problem report message should contain parameters (k, L, U, C(k)).

In addition to the above, each timeout expiration event typically requires specific handling, such as for a traffic hit, equipment failure or period of silence (step 78). In the event of a traffic hit, and in the case of variable length data units and an uncorrectable error in data unit(s), the channel ends are resynchronized before further data transmission occurs. The problem here being that for the erred data unit(s) the number of error units and their D(j) parameters are unknown for the receive side and the receiver cannot correctly update the parameters U, L(k) and C(k). In the case of constant length data units and a single erred data unit there are good chances to continue data transfer with further erred data unit retransmission. Note that it is also possible to claim channel failure if there are too many traffic hits (as per a standard statistical criteria).

In the event of equipment failure, a resynchronization is required after channel blocking in the group. In the DOCSIS specific case, the downstream channels from the cable modem termination system (CMTS) to a given cable modem (CM) typically fall together. For channels based on separate links, a procedure for single channel removal from the group can be considered.

In the event of a silent period, the best workaround is to transmit empty data units during silence intervals.

Figure 5:
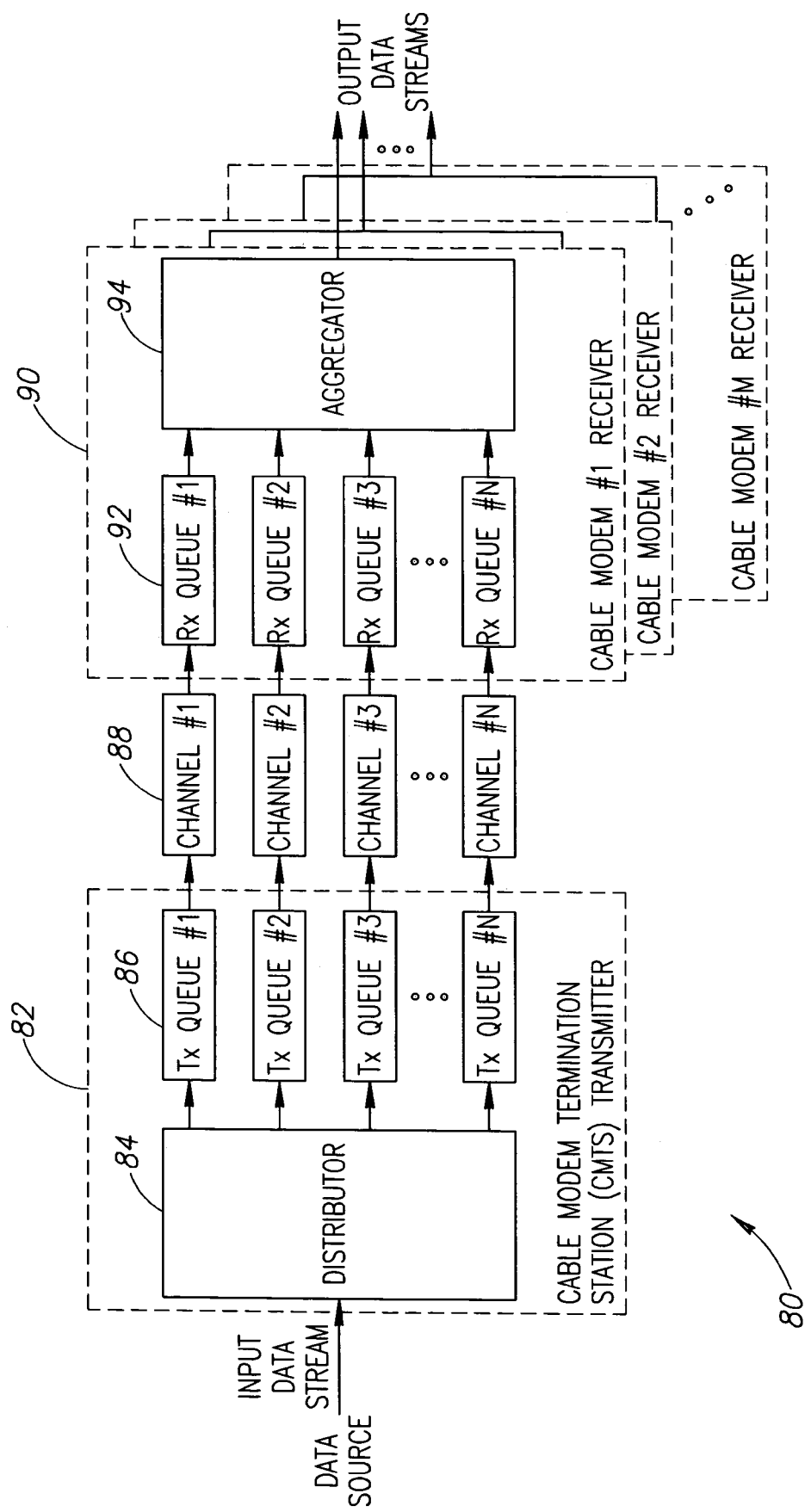
FIG. 5 is a block diagram illustrating an example embodiment constructed in accordance with the method of data transmission over a channel group of the present invention and adapted to operate in a DOCSIS communications system.
Figure 6:
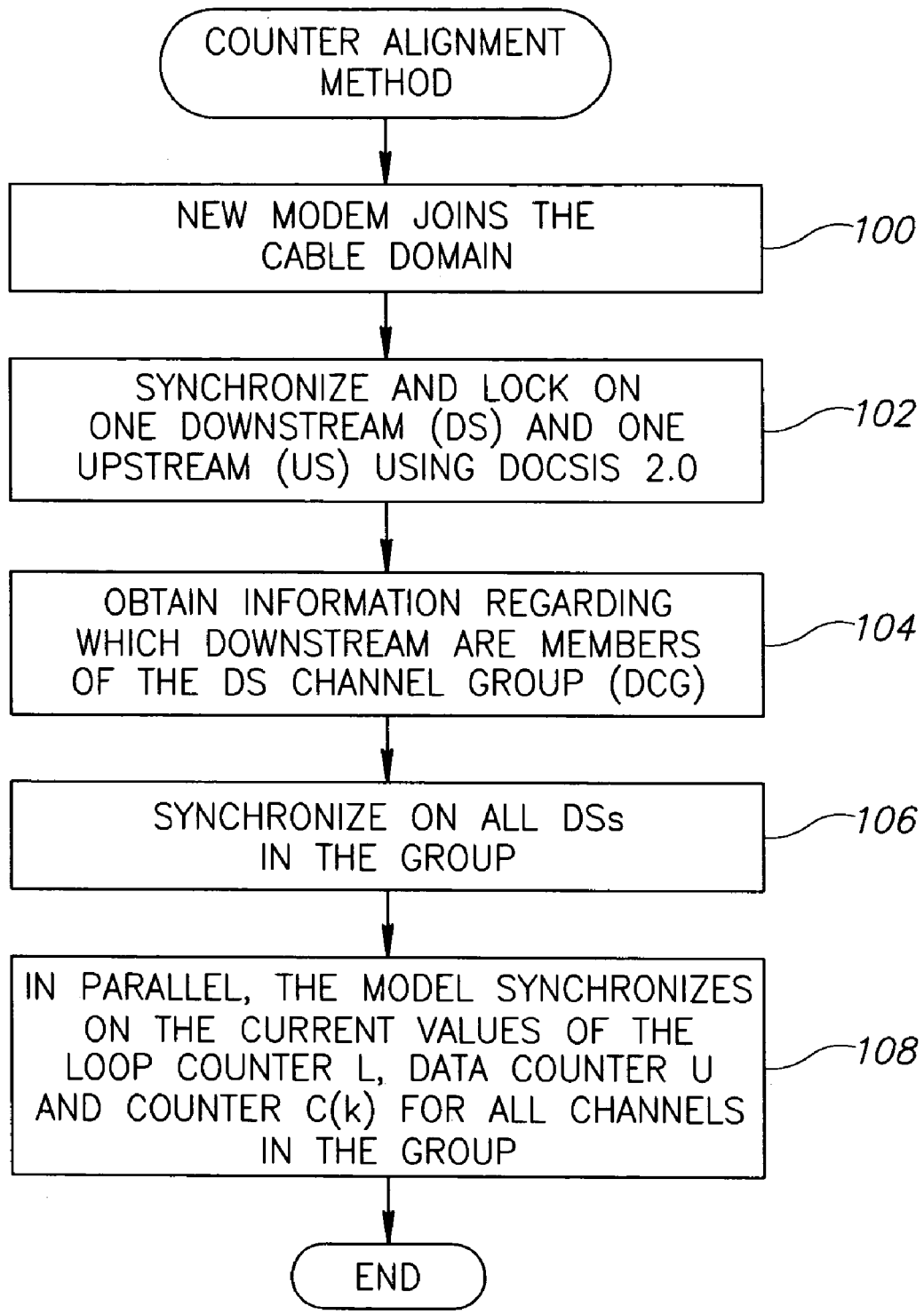
FIG. 6 is a flow diagram illustrating the counter alignment method of the present invention in more detail.

An example of the data transmission scheme of the present invention as applied to a DOCSIS system will now be presented. A block diagram illustrating an example embodiment constructed in accordance with the method of data transmission over a channel group of the present invention and adapted to operate in a DOCSIS communications system is shown in FIG. 5. The communication system, generally referenced 80, comprises a data source for providing an input data stream, transmitter 82, a plurality of N physical channels 88, a plurality of cable modem receivers 90 adapted to generate N output data streams. The transmitter 82 comprises a distributor module 84 adapted to receive the input data stream from the data source and a plurality of N transmit queues 86 coupled to the distributor and to the channels 88. The receivers 90 each comprises a plurality of N receive queues 92 coupled to an aggregator 94. Each aggregator generates the output data stream to its own data sink.

In accordance with the invention, the distribution block 84 on the transmitter side is operative to decide over which channel to transmit each input data unit. Similarly, the aggregation block 94 on the receive side functions to collect and restore the order of the data units to generate a single output data stream. A key feature of the invention is that the distributor and aggregators must implement the same data unit distribution algorithm and associated parameters. The algorithm performed by the distributor is operative to generate a sequence of action that can be completely and permanently reproduced on the receive side. In a DOCSIS system, the transmitter is inside a cable modem termination station (CMTS). On the other end of the link, a plurality of M receivers, each located in a different cable modem operate in parallel to generate M output data streams.

The counter alignment method of the present invention will now be described in more detail below. In the descriptions of the distributor and aggregator methods hereinabove, it was assumed that the methods are correctly started (i.e. counters reset, etc.) on both channel sides (i.e. transmit and receive). In some cases, it is desirable to start the receiving process from some time point during the transmission from the current counter, i.e. values other than zero. For example, this may happen when the receiver attempts to resynchronize the transmission process after a traffic hit. Considering a DOCSIS system, this is applicable in the case where a cable modem joins an existing network. The following method describes how to initialize a new modem that joined the cable domain. Note that for illustration purposes, the method is described in the context of a DOCSIS system. It is appreciated, however, one skilled in the art can define a similar process for other protocols as well as an addition to an auto-negotiation protocol.

In a DOCSIS cable system, the new modem attempting to join the cable domain (step 100) should synchronize and lock on one downstream (DS) and one upstream (US) using DOCSIS2.0 (step 102). Therefore, it selects a DS that supports DOCSIS2.0. At this point, it obtains information including which DSs are members of the DS Channel Group (DCG) (step 104). In addition, the modem should then synchronize on all DSs in the group (step 106). In parallel, the modem should then synchronize on the current values of the loop counter L, data unit counter U and C(k) counter for all channels in the group (step 108). Note that the update of these counters should be periodically sent by the transmit side for each channel in the group separately. It should be used by the new modems joining the cable domain as well as by the existing modems to ensure that they are still synchronized with the distributor. For this purpose the SYNC message can be extended by adding fields/TLVs for L(k), U and C(k) counters. The field/TLV should represent the L, U and C(k) values at the moment the data unit enters the Tx queue of the particular channel k. Note that alternative to the SYNC message may be used. For example, alternatives to the SYNC message include (1) a new message type; (2) another message type extension (3) an MPEG solution—a special MPEG block indicating the counter for the given channel k transmitted by k, generated by the Tx PHY k, and not forwarded to the MAC.

Getting the set (L, $\underline{U}$, C(k)) for the current channel k, permits the aggregator to update these parameters (using the algorithm from the previous paragraph) upon the arrival of each data unit on this channel and to be fully synchronized with the distributor side in this aspect. From here on each data unit D(j) can obtain its relevant parameters (L, U, C(k)) that should be kept with the data unit for correct aggregation or error handling. In this case, there are some differences in the logic of the distributor and aggregator. For the distributor, L—is a common parameter for the channel group. For the aggregator, L(k) is the loop number for the currently received data units on channel k.

Now consider that Lmax is the largest loop number over all current L(k) values that the aggregator keeps when it begins multi-channel receiving, while also taking into account the possible wrap around of the cycle counter. This means that data units having Lj<=Lmax should be ignored because the receiving was started too late to provide full aggregation of this data. Only starting from data units with counters Lj>Lmax can be aggregated without loss of data units.

This mechanism enables a modem to start receiving multi-channel data whenever it requires to do so (here scenarios of modem or CMTS initiative can be considered). The modem can always revert to uni-channel DS as well (it can be also initiated by CM or CMTS). An additional mechanism of obtaining instructions/permissions from the CMTS for such switches is required. DCC command can be one of the possible ways to initiate a switch of this kind.

It is important to note that the data transmission scheme of the present invention is not limited for use with any specific protocol. It is appreciated that one skilled in the art can apply the data transmission of the present invention to numerous other protocols and layers without departing from the scope of the invention. For example, the scheme can be used at layer 1 of the OSI model stack as well at higher layers.

Note also that some specific data units may require transmission by a particular channel or subset of channels within the channel group. This enables the scheme to operate in certain environments comprising legacy systems. Note also that the data transmission scheme may be used for either point-to-point or point-to-multipoint data transmission.

The scheme can also be modified to support setting priority on individual data unit transmission. As applied to a DOCSIS system, the scheme can be used for data unit distribution at the packet level, at the MPEG level or the byte group level, in accordance with the DOCSIS 3.0 proposed specification. Further, the features of the data transmission scheme allow compatibility with not only existing versions of cable modems but any future cable modem versions as well.

The above-described methods considered a situation wherein data units of one or several data streams are distributed between physical channels of a group. In practice, however, the situation can be different. In particular (1) some data units may be intended for transmission by a particular channel in the group, such as for DOCSIS1.x and DOCSIS2.0 legacy modem support, or for some specific management messages like the SYNC message; and (2) some data units may be intended to be transferred by a subset of channels in the group (typically defined as another channel group).

In accordance with the invention, modifications to the algorithms presented above can be made as follows. First, an additional table per channel group is maintained in the distributor. This table comprises, for each destination ID (Service ID/Flow ID) a set of bits indicating which channels are acceptable for the particular data unit. Second, when a data unit is to be transmitted over channel k, the distributor, instead of taking the first data unit in the incoming queue, searches through the queue seeking a data unit that can be transmitted by channel k. If such a data unit exists in the queue, the distributor moves this unit to the channel k Tx queue (otherwise it can queue an empty data unit).

This approach can change the order of transmission of the data units, but does not change the order of the data units for each Service ID. Note that this approach cannot be used on the MPEG level because the MPEG header does not contain any fields such as Service ID. One possible solution is to add a prefix to each MPEG for internal usage between MAC and Distributor and use it for Service ID indication.

It can be important for some specific data units to be delivered with minimal delay. For such situations, the input data unit queue before the distributor is replaced by two or more data queues. The distributor searches for the current data unit for handling at the high priority queue and only if there is nothing to transmit for the given channel k does it search the lower priority queues. Here the parameter T determines the typical delay of high priority packets transmission. Therefore, the expected delay can be changed by changing the T parameter for the group.

Some of the advantages of the data transmission scheme of the invention were described hereinabove. On the one hand, an advantage is that the method provides a general and more flexible approach to the data transmission problem. On the other hand, the implementation of this method is relatively simple and does not require much large additional hardware resources. In particular (1) the algorithm is flexible enough to allow arbitrary downstream profile relations between channels, R-S encoding parameters, etc; the algorithm loads the channels in accordance with their bandwidth; (2) the algorithm does not assume constant data unit length; therefore the methods of the invention can be implemented for packets or MPEG distribution; (3) the addition of new transmission profile does not require a hardware or software redesign; (4) the transmit profile parameters may be modified "on the fly"; and (5) the data unit length parameters in the description above can be measured in bytes, symbols, bits or any other suitable units.

In the context of a DOCSIS system, the data transmission scheme of the present invention is operative not only in the downstream but in the upstream as well. In a DOCSIS network, the Upstream (US) protocol is more complicated than the Downstream (DS) protocol. The need to provide multi-channel transmission in the US direction is typically less than that for the DS. In accordance with the invention, in order to provide multi-channel transmission in the US direction, several US channels are fully dedicated for a particular cable modem. For example, a plurality of channels may be dedicated in a modem by not sending initial ranging opportunities after transmission session starts for the upstreams to be dedicated for use as a channel group. Thus, one or more upstreams are dedicated and monopolizing for data transmission in accordance with the invention. This prevents other modems from connecting to these upstreams. This permits the data transmission scheme to be used for Upstream multi-channel transmission as well as Downstream transmission. Preferably, unsolicited grant (USG) is employed in this case.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of multi-channel data transmission over a channel group having a plurality of channels, said method comprising the steps of:
   first determining at a transmitter, for each data unit to be transmitted, a designated channel each data unit is to be transmitted over;
   transmitting each data unit over the designated channel assigned thereto;
   second determining at a receiver, the designated channel a data unit is to be received over;
   receiving each data unit over its designated channel;
   passing counter values to a newly joined receiver or to a receiver after the occurrence of a traffic hit;
   synchronizing a new modem and locking on one downstream and one upstream;
   synchronizing on all downstreams in said channel group; and
   synchronizing on current values of a loop counter, data counter and credit counter, the loop counter being the currently received data units for each channel in the channel group, the data counter being a data unit cyclic counter, and the credit counter being a bytes counter for each channel in the channel group.

2. The method according to claim 1, wherein said step of first determining comprises the step of maintaining one of the counter values for each channel whereby transmission over a channel only occurs if the value of the counter associated therewith is greater than zero.

3. The method according to claim 1, wherein said step of receiving comprises the step of waiting with a timeout until data is ready on said designated channel.

4. The method according to claim 3, wherein the timeout for each channel is at least the time required for maximal data unit transmission by that channel.

5. The method according to claim 1, wherein said plurality of channels comprises variable bandwidth channels.

6. The apparatus according to claim 1, wherein transmission of data over said channel group appears as transmission over a single logical channel having a bandwidth approximately equal to the sum of the bandwidths of said plurality of channels.

7. The method according to claim 1, wherein said step of first determining comprises transmitting more data over a higher bandwidth channel within said channel group than over a lower bandwidth channel.

8. The method according to claim 1, wherein said data units are of fixed length.

9. The method according to claim 1, wherein said data units arc of variable length.

10. The method according to claim 1, wherein said method is adapted to be implemented in a Data-Over-Cable Service Interface Specification (DOCSIS) enabled communications system.

11. The method according to claim 1, wherein data units of a conversation are transmitted over different channels. synchronizing on current value of a loop counter, data counter and credit counter, the loop counter being the currently received data units for each channel in the channel group, the data counter being a data unit cyclic counter, and the credit counter being a bytes counter for each channel in the channel group.

12. The method according to claim 1, further comprising the step of assigning a transmission credit to each channel during each cycle through the channels in said channel group in accordance with its transmission capacity so as to provide load balancing.

13. The method according to claim 12, wherein said transmission credit is modified in response to changes in channel bandwidth.

14. The method according to claim 1, further comprising the step of transmitting data units over a subset of channels within said channel group.

15. The method according to claim 1, further comprising the step of transmitting a data unit in accordance with a priority assigned thereto.

16. A method of data transmission over a channel group having a plurality of channels, said method comprising the steps of:
   receiving an input stream of data units to be transmitted over said channel group;
   transmitting said data units over a current channel;
   determining when to cease transmission on said current channel and begin transmitting on a next channel within said channel group based on the value of a transmit counter associated with said current channel;
   passing counter values to a newly joined receiver or to a receiver after the occurrence of a traffic hit;
   synchronizing a new modem and locking on one downstream and one upstream;
   synchronizing on all downstreams in said channel group; and 17. The method according to claim 16, wherein said step of determining comprises the step of maintaining one of the counter values for each channel whereby transmission over a channel only occurs if the value of the counter associated therewith is greater than zero.

18. The method according to claim 16, wherein said plurality of channels comprises variable bandwidth channels.

19. The apparatus according to claim 16, wherein transmission of data over said channel group appears as transmission over a single logical channel having a bandwidth approximately equal to the sum of the bandwidths of said plurality of channels.

20. The method according to claim 16, wherein said step of determining comprises transmitting more data over a higher bandwidth channel within said channel group than over a lower bandwidth channel.

21. The method according to claim 16, wherein said data units are of fixed length.

22. The method according to claim 16, wherein said data units are of variable length.

23. The method according to claim 16, wherein said method is adapted to be implemented in a Data-Over-Cable Service Interface Specification (DOCSIS) enabled communications system.

24. A method of data transmission over a channel group having a plurality of channels, said method comprising the steps of:
  first determining at a transmitter, for each data unit to be transmitted, whether to send said data unit over a current channel or a next channel in said channel group based on a first current counter value, to yield a first channel selection thereby;
  transmitting each data unit over its first channel selection associated therewith;
  second determining at a receiver, whether to receive a data unit over said current channel or said next channel in said channel group based on a second current channel value, to yield a second channel selection thereby;
  receiving a data unit over its second channel selection associated therewith;
  passing counter values, including the first current counter value, to a newly joined receiver or to a receiver after the occurrence of a traffic hit;
  synchronizing a new modem and locking on one downstream and one upstream;
  synchronizing on all downstreams in said channel group; and
  synchronizing current values of a loop counter, data counter and credit counter, the loop counter being the currently received data units for each channel in the channel group, the data counter being a data unit cyclic counter, and the credit counter being a bytes counter for each channel in the channel group.

25. The method according to claim 24, wherein said step of first determining comprises the step of maintaining one of the counter values for each channel whereby transmission over a channel only occurs if the value of the counter associated therewith is greater than zero.

26. The method according to claim 24, wherein said step of receiving comprises the step of waiting with a timeout until data is ready on said designated channel.

27. The method according to claim 26, wherein the timeout for each channel is at least the time required for maximal data unit transmission by that channel.

28. The method according to claim 24, wherein said plurality of channels comprises variable bandwidth channels.

29. The apparatus according to claim 24, wherein transmission of data over said channel group appears as transmission over a single logical channel having a bandwidth approximately equal to the sum of the bandwidths of said plurality of channels.

30. The method according to claim 24, wherein said step of first determining comprises transmitting more data over a higher bandwidth channel within said channel group than over a lower bandwidth channel.

31. The method according to claim 24, wherein said data units are of fixed length.

32. The method according to claim 24, wherein said data units are of variable length.

33. The method according to claim 24, wherein said method is adapted to be implemented in a Data-Over-Cable Service Interface Specification (DOCSIS) enabled communications system.

34. An apparatus for data transmission over a channel group having a plurality of channels, comprising:
  a distributor at a transmitter coupled to a data source and said channel group, said distributor operative to determine, based on a first counter value associated with a channel, whether to transmit a data unit over a current channel or a next channel within said channel group and to transmit said data unit in accordance with a first determination;
  one or more aggregators at a receiver coupled to said channel group and operative to determine, based on a second counter value associated with a channel, whether to receive a data unit over said current channel or said next channel and to receive said data unit in accordance with a second determination;
  means for passing counter values, including the first and second counter values, to a newly joined receiver or to a receiver after the occurrence of a traffic hit; and
  counter alignment means, said counter alignment means comprising: means for synchronizing a new modem and locking on one downstream and one upstream;
    synchronizing on all downstreams in said channel group; and synchronizing on current values of a loop counter, data counter and credit counter.

35. The apparatus according to claim 34, wherein said distributor comprises means for maintaining said first counter value for each channel whereby transmission over a channel only occurs if the value of the counter associated therewith is greater than zero.

36. The apparatus according to claim 34, wherein said aggregator comprises means for maintaining said second counter value for each channel whereby transmission over a channel only occurs if the value of the counter associated therewith is greater than zero.

37. The apparatus according to claim 34, wherein each said aggregator comprises means for waiting with a timeout until data is ready on said designated channel.

38. The apparatus according to claim 37, wherein the timeout for each channel is at least the time required for maximal data unit transmission by that channel.

39. The apparatus according to claim 34, wherein said plurality of channels comprises variable bandwidth channels.

40. The apparatus according to claim 34, wherein transmission of data over said channel group appears as transmission over a single logical channel having a bandwidth approximately equal to the sum of the bandwidths of said plurality of channels.

41. The apparatus according to claim 34, wherein said distributor is operative to transmit more data over a higher bandwidth channel within said channel group than over a lower bandwidth channel.

42. The apparatus according to claim 34, wherein said data units are of fixed length.

43. The apparatus according to claim 34, wherein said data units are of variable length.

44. The apparatus according to claim 34, wherein said apparatus is adapted to be implemented in a Data-Over-Cable Service Interface Specification (DOCSIS) enabled communications system.

45. The apparatus according to claim 34, wherein said distributor is to be implemented in a cable modem termination system (CMTS) unit in a Data-Over-Cable Service Interface Specification (DOCSIS) enabled communications system.

46. The apparatus according to claim 34, wherein each of said one or more aggregators is adapted to be implemented in a Data-Over-Cable Service Interface Specification (DOCSIS) enabled communications system.

47. The apparatus according to claim 34, wherein data units of a conversation are transmitted over different channels.

48. The apparatus according to claim 34, further comprising means for assigning a transmission credit to each channel during each cycle through the channels in said channel group in accordance with its transmission capacity so as to provide load balancing.

49. The apparatus according to claim 48, wherein said transmission credit is modified in response to changes in channel bandwidth.

50. The apparatus according to claim 34, further comprising means for transmitting data units over a subset of channels within said channel group.

51. The apparatus according to claim 34, further comprising means for transmitting a data unit in accordance with a priority assigned thereto.

52. The method according to claim 16, wherein the transmitting of said data units is performed over each channel of the plurality of channels for a predefined time period, according to a transmission credit data length proportional to a variable bandwidth of each of the channels before cycling to the next channel in the plurality of channels in a predetermined sequence.

53. The method according to claim 24, wherein the transmitting is performed over each channel of the plurality of channels for a predefined time period, according to a transmission credit proportional data length to a variable bandwidth of each of the channels before cycling to the next channel in the plurality of channels in a predetermined sequence of channels; and the receiving is performed according to the same predetermined sequence of channels and according to the same transmission credit proportional data length to the variable bandwidth of each of the channels.

* * * * *